United States Patent
Beni et al.

(10) Patent No.: US 7,003,278 B2
(45) Date of Patent: Feb. 21, 2006

(54) PORTABLE SEARCH AND RESCUE SYSTEM

(75) Inventors: Itzhak Beni, Givatayim (IL); Pinhas Tovi, Rishon Le Zion (IL)

(73) Assignee: Tadiran Spectralink Ltd., Holon (IL)

( * ) Notice: Subject to any disclaimer, the term of this patent is extended or adjusted under 35 U.S.C. 154(b) by 0 days.

(21) Appl. No.: 10/170,468

(22) Filed: Jun. 14, 2002

(65) Prior Publication Data
US 2003/0003893 A1    Jan. 2, 2003

(30) Foreign Application Priority Data
Jun. 28, 2001 (IL) .................................. 144052

(51) Int. Cl.
*H04M 11/04* (2006.01)
*H04Q 7/20* (2006.01)
*G08G 3/00* (2006.01)

(52) U.S. Cl. .................... 455/404.1; 455/431; 340/988

(58) Field of Classification Search ................ 455/404, 455/431, 404.1; 340/988
See application file for complete search history.

(56) References Cited

U.S. PATENT DOCUMENTS

| 5,389,934 | A |   | 2/1995  | Kass |
|-----------|---|---|---------|------|
| 5,414,432 | A |   | 5/1995  | Penny, Jr. et al. |
| 5,519,403 | A |   | 5/1996  | Bickley et al. |
| 5,629,693 | A | * | 5/1997  | Janky .......................... 340/988 |
| 5,661,652 | A |   | 8/1997  | Sprague et al. |
| 5,726,663 | A |   | 3/1998  | Moyer et al. |
| 5,748,147 | A |   | 5/1998  | Bickley et al. |
| 5,847,679 | A |   | 12/1998 | Yee et al. |
| 6,011,510 | A |   | 1/2000  | Yee et al. |
| 6,628,941 | B1 | * | 9/2003 | Knoblach et al. ............ 455/431 |
| 2003/0003893 | A1 | * | 1/2003 | Beni et al. ................... 455/404 |

FOREIGN PATENT DOCUMENTS

EP           1271172 A2 *   1/2004

* cited by examiner

Primary Examiner—William D. Cumming

(57) ABSTRACT

A search and rescue system comprising an integral Interrogation, Decoding and Display Unit and a plurality of Personal Survival Units which can intercommunicate and are capable of transmitting GPS generated location information. A number of applications are described.

46 Claims, 3 Drawing Sheets

PORTABLE SEARCH AND RESCUE SYSTEM

FIELD AND BACKGROUND OF THE INVENTION

The present invention relates to the field of survival radios and, more particularly, to a search and rescue system consisting of a primary interrogation, decoding and display unit and a plurality of portable beacon radios.

Radio based search and rescue systems are in common usage in aviation. Personal survival radios (PSR) are standard equipment for military pilots and for others who routinely carry out missions in remote locations.

Most search and rescue systems are based on determining the position of a downed aviator's emergency emitter, customarily a beacon radio, by means of various types of direction finding and range finding devices that detect its signal. Early versions of such technology required the radio beacon signal to be transmitted continuously in order to calculate range and bearing. Later versions employed GPS technology to enable the beacon to produce its own location information. GPS technology does not require that the radio transmit continuously. Rather, the searching transceiver may periodically prompt the PSR to transmit GPS generated location information. Such prompting, obviating the need for continuous signal transmission, provides many benefits, particularly in combat environments where disclosure of the survivor's position may expose him to harm from enemy forces.

The technology of survival radios is well known in the art. U.S. Pat. No. 5,847,679 assigned to Motorola, Inc., reflects an airborne GPS based system that incorporates "over the horizon" extended range capability. U.S. Pat. No. 6,011,510, also assigned to Motorola, Inc., teaches a PSR as an element of an airborne search and rescue system which transmits a GPS derived location signal. Such technology, which was specifically conceived and designed for military and paramilitary use, is incorporated into Motorola, Inc.'s AN/PRC-112 PSR. This radio, and others like it, have wide application in aviation for rescuing downed airmen.

The systems referred to above are designed to be installed within aircraft. They allow an airborne searching transceiver to send interrogation messages to an identified PSR. Upon receiving such a message, the PSR will respond with location information and, in some cases, a text message. Such systems use the transceiver of the aircraft in which they are installed and therefore communicate on the UHF frequencies utilized by the avionics of the aircraft. Such systems are not portable, versatile nor capable of various applications.

A further limitation of such systems is the inability of one PSR to communicate with another PSR. This feature would be particularly helpful when more than one airman from the same aircraft is down within a relatively small geographic area and contact between them would enhance their chances of survival.

Accordingly, there is a need for a simple, portable, versatile and inexpensive search and rescue system that incorporates a number of small hand-held units that may communicate among themselves.

SUMMARY OF THE INVENTION

It is an object of the present invention to provide a search and rescue system that is portable, versatile, inexpensive and which communicates on standard communication channels.

It is a further object of the present invention to provide a search and rescue system that includes a plurality of hand-held personal survival units that are capable of communicating with each other.

According to one aspect of the present invention there is provided a search and rescue system comprising an integral Interrogation, Decoding and Display Unit (IDDU) which is attachable to a transceiver capable of operating on standard radio communication frequencies, and which comprises a first processor for generating at least one interrogation message. The search and rescue system also comprises at least one Personal Survival Unit (PSU) which comprises a second transceiver; a GPS module for receiving GPS signals; a second processor comprising message authorization functionality for identifying received transmissions that comprise the identification code and for authorizing the PSU to respond to the identified transmissions.

According to another aspect of the present invention there is provided a search and rescue system comprising an integral IDDU which is attachable to a transceiver capable of operating on standard radio communication frequencies, and which comprises a first processor for generating at least one interrogation message. The search and rescue system also comprises a plurality of PSU's, each being capable of communicating with at least one other PSU. Each PSU comprises a second transceiver; a GPS module for receiving GPS signals and for deriving location information therefrom; a second processor comprising message authorization functionality for identifying received transmissions that comprise the identification code and for authorizing the PSU to respond to the identified transmissions, the second processor being also for selecting at least one additional identification code identifying at least one other PSU and for causing the second transceiver to send messages thereto and receive messages therefrom.

According to features in the described preferred embodiments the response of the PSU comprises GPS signals usable by the IDDU to derive location information therefrom.

According to features in the described preferred embodiments the GPS module comprises a locator unit to derive location information from said GPS signals.

According to features in the described preferred embodiments the transceiver is part of a base unit of a mobile radio communication system.

According to features in the described preferred embodiments the PSU is incorporated within a mobile unit of the mobile radio communication system.

According to features in the described preferred embodiments the IDDU is man portable.

According to features in the described preferred embodiments the IDDU further comprises a first memory for storing programs for operating the first processor, identity codes identifying at least one PSU and the responses received from the PSU.

According to features in the described preferred embodiments the IDDU further comprises a GPS module for receiving GPS signals and for deriving location information therefrom.

According to features in the described preferred embodiments the first memory is further for storing location information.

According to features in the described preferred embodiments the IDDU further comprises a user input interface which includes a numerical keypad and controls for a transceiver.

According to features in the described preferred embodiments the IDDU further comprises an output interface which is a display screen.

According to features in the described preferred embodiments the first processor comprises cryptographic functionality for encrypting outgoing messages and decrypting incoming messages.

According to features in the described preferred embodiments the first processor is attached to an output for outputting message data for display.

According to features in the described preferred embodiments the second processor comprises cryptographic functionality for encrypting outgoing messages and decrypting incoming messages.

According to features in the described preferred embodiments the second processor is attached to an output for outputting message data for display.

According to features in the described preferred embodiments the PSU further comprises a second memory for storing at least one identification code and the location information, the second memory further being for storing programs for operating the second processor, text data comprising predetermined messages and messages received.

According to features in the described preferred embodiments the PSU further comprises a user input interface comprising a plurality of keys.

According to features in the described preferred embodiments the PSU further comprises an output interface which is a display screen.

According to features in the described preferred embodiments the PSU is capable of communicating with at least one other PSU that comprises a part of the search and rescue system.

According to features in the described preferred embodiments the second transceiver is capable of transmitting and receiving text data.

According to features in the described preferred embodiments the text data is selected from predetermined messages stored in the second memory.

According to features in the described preferred embodiments the PSU further comprises a microphone and a speaker, the second transceiver being capable of transmitting and receiving audio data.

The present invention successfully addresses the shortcomings of the presently known configurations by providing a portable, versatile and inexpensive search and rescue system that includes a plurality of personal survival units that are capable of communicating with each other.

BRIEF DESCRIPTION OF THE DRAWINGS

With specific reference now to the drawings in detail, it is stressed that the particulars shown are by way of example and for the purposes of illustrative discussion of the preferred embodiment of the present invention only, and are presented in the cause of providing what is believed to be the most useful and readily understood description of the principles and conceptual aspects of the invention. In this regard, no attempt is made to show structural details of the invention in more detail that is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
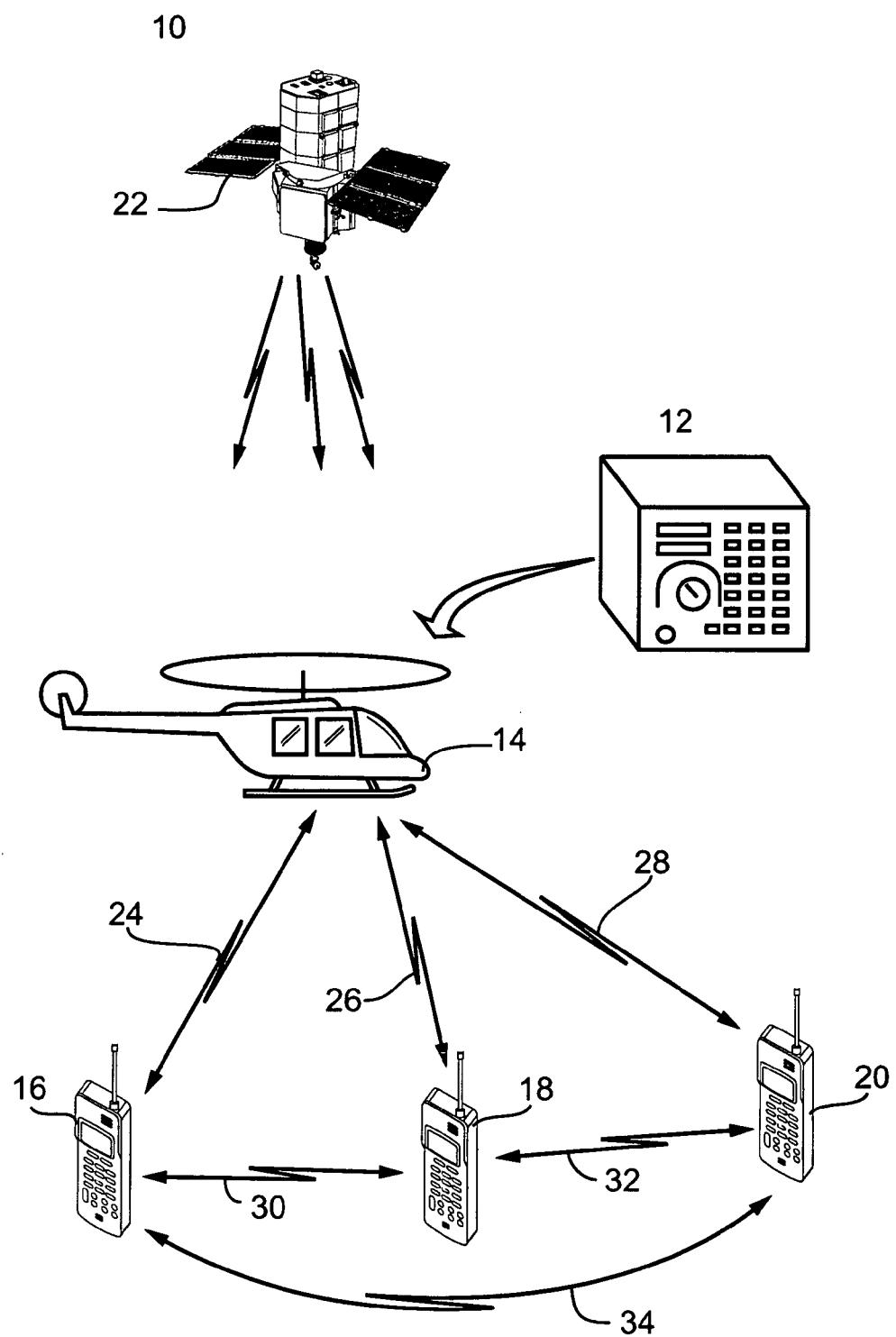
FIG. 1 is an illustration of a Search And Rescue System constructed in accordance with the present invention.

Before explaining at least one embodiment of the invention in detail, it is to be understood that the invention is not limited in this application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Reference is now made to FIG. 1 which shows a search and rescue system in accordance with the teachings of the present invention, which is referred to hereinafter as SARS 10. SARS 10 comprises an Interrogation, Decoding and Display Unit, hereinafter referred to as IDDU 12, which in the preferred embodiment is operable from helicopter 14. IDDU 12 communicates via helicopter 14's UHF transceiver with a plurality of Personal Survival Units (PSU), hereinafter referred to as PSU 16, 18 and 20. PSU 16, 18 and 20 each contain a Global Positioning System (GPS) module which is capable of receiving GPS signals from a number of synchronous GPS satellites, including satellite 22, and is capable of deriving its present position therefrom. IDDU 12 communicates with PSU 16, 18 and 20 on Line of Sight (LOS) UHF paths 24, 26 and 28 respectively. In addition, each PSU communicates with the other PSUs via an integral transceiver within each one on UHF paths 30, 32 and 34: PSU 16 and 18 communicate on path 30, PSU 16 and 20 communicate on path 34, and PSU 18 and 20 communicate on path 32. According to a preferred embodiment of the present invention, SARS 10 is part of or incorporated into a mobile radio communication system, with IDDU 12 and the transciever to which it is attached forming a part of the base unit of the system and each PSU being incorporated within a mobile unit of the system.

FIG. 1 depicts an embodiment of SARS 10 in which it operates from an airborne rescue platform. The base of the search being conducted by IDDU 12 is helicopter 14. In this embodiment, IDDU 12 is installed in helicopter 14 and is connected to the transceiver of helicopter 14. In further embodiments, SARS 10 could operate from a sea borne rescue platform such as a boat or land based rescue platforms such as a building, tree or forest tower. It is appreciated that IDDU 12 may be configured to be connected to any power source and transceiver in close proximity thereto. In this respect, IDDU 12 is designed to be lightweight, of simple and durable construction and modular such that a transceiver may be easily connected thereto.

Figure 2:
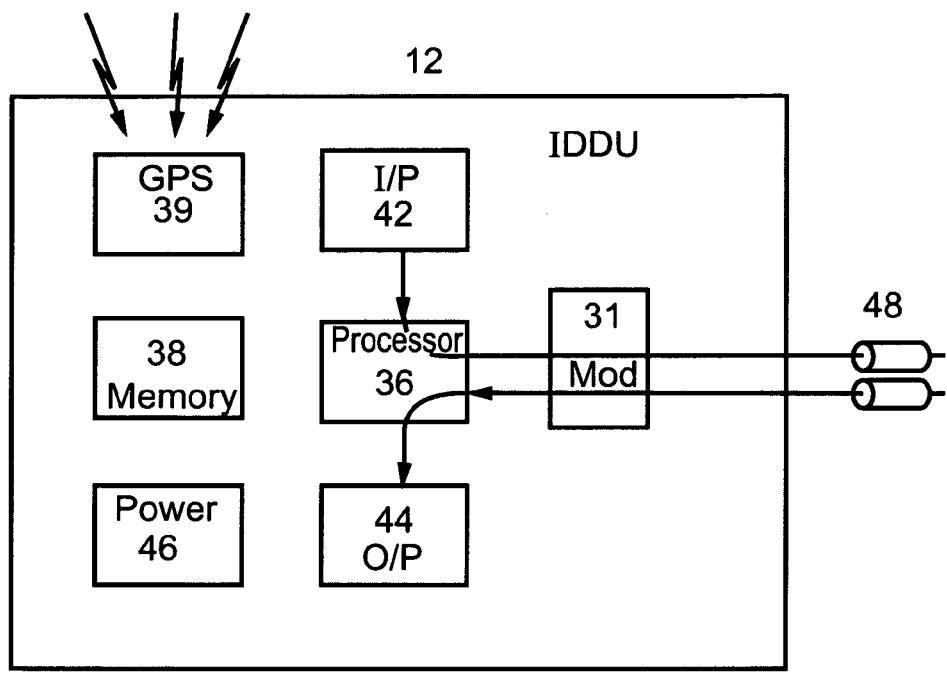
FIG. 2 is a black box diagram of the components of the Interrogation, Decoding and Display Unit of the Search And Rescue System of FIG. 1.

Reference is now made to FIG. 2 which is a black box diagram which illustrates the configuration of IDDU 12. The components of LDDU 12 illustrated include a processor 36 which is programmed to carry out such functions as causing the transceiver (not shown) to which IDDU 12 is connected to transmit and receive data, generating interrogation messages, encrypting and decrypting incoming and outgoing messages, identifying a recipient by matching identity codes, and identifying responses to messages by matching identity codes. IDDU 12 is attachable to a transceiver by connectors 48. Processor 36 may be a conventional commercially available processor such as the MOTOROLA MC68331 or the INTEL 80C51FA processors.

IDDU 12 includes GPS module 39 which provides it the capability to receive and interpret GPS signals.

IDDU 12 includes memory 38 which comprises both a RAM component for storing temporary data during the operation of IDDU 12 and a ROM component for storing the executable programs of IDDU 12. Memory 38 stores data such as identity codes, interrogation messages and responses to messages such as location information. Further embodiments may provide the capability to load additional programs and data into the ROM by providing a memory card interface.

A user will interact with IDDU 12 via input interface 42 and output interface 44. Input interface 42 preferably consists of a numerical keypad for inputting such data as frequencies, identification codes, encryption key status, outgoing messages, etc. Input interface will preferably include controls for a transceiver which will be enabled or disabled as required according to the transceiver to which IDDU 12 is connected. It is appreciated that further embodiments may provide input interfaces with different modalities such as an alphanumeric keyboard, a touch screen, dials, knobs or voice activation, in accordance with then current technology.

Output interface 44 comprises a display screen which may be of LCD type or any other type which may display parameters such as identification codes, encryption key status, outgoing messages, and incoming data from PSU's such as identity codes, location information or other data.

Input and output signals between processor 36 and the transciever in use pass through modulator/demodulator 31. Modulator/demodulator 31 is a standard voice modem that modulates outgoing data on a voice channel to fit any transceiver input signal requirements and demodulates the incoming data on a voice channel from the output signals of a transceiver.

IDDU 12 may be connected to any transceiver which may be of conventional design, configured to operate on standard radio communication frequencies using conventional communication parameters such as baud rate, data format, packet size, AM or FM modulation, etc. Further embodiments of SARS 10 will accommodate modifications in radio communication technology as they occur. Further, it is possible to conceive of a future in which the globe is covered with cellular and other communication channels. Future embodiments of SARS 10 may incorporate any such communication technology prevalent at the time.

Power pack 46 is of a conventional type, designed to deliver appropriate voltages to each of the components of IDDU 12 as required. Power pack 46 is powered by a battery (not shown) which is disabled when IDDU 12 is connected to another power source, such as might be found in an aircraft, sea vessel or building.

It is appreciated that IDDU 12 is the searching element of SARS 10 and is designed to be portable, versatile and rugged. Future embodiments will no doubt be developed in which IDDU 12 is made lighter, smaller, easier to install and remove and more durable. Accordingly, its size, shape and components may vary, but all such configurations are contemplated within the claims appended hereto.

Figure 3:
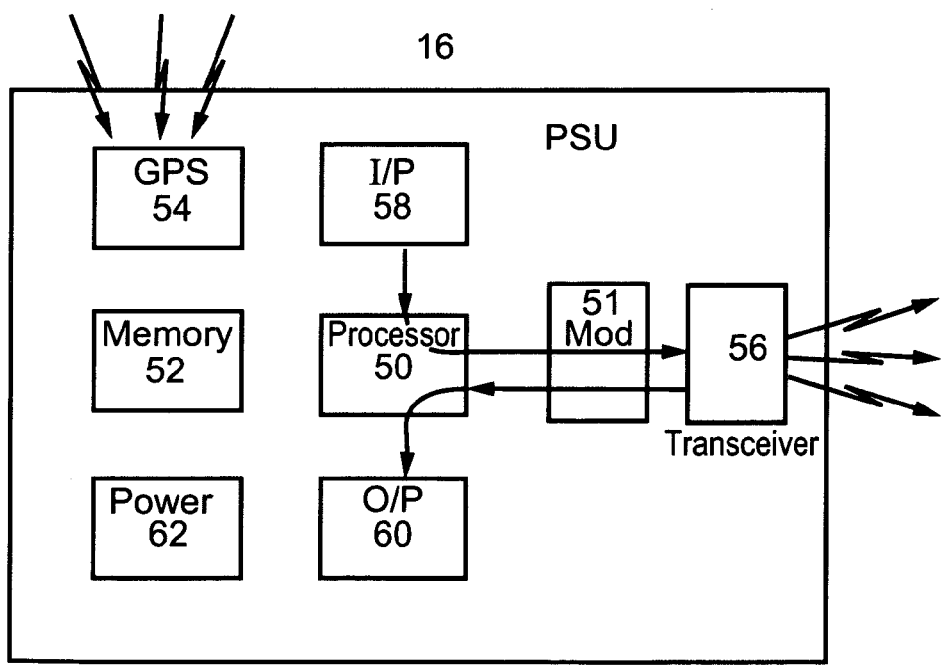
FIG. 3 is a black box diagram of the components of a Personal Survival Unit of the Search And Rescue System of FIG. 1.

Reference is now made to FIG. 3 which is a black box diagram which illustrates the configuration of PSU 16. The components of PSU 16 illustrated include processor 50 which is programmed to carry out such functions as causing transceiver 56 to transmit and receive messages and data, encrypting and decrypting incoming and outgoing messages, identifying a recipient to which it sends data by matching identity codes, identifying responses to messages by matching identity codes, and outputting incoming messages for display. Processor 50 may be a conventional commercially available processor.

PSU 16 includes GPS module 54 which provides it the capability to receive and interpret GPS signals.

PSU 16 includes memory 52 which comprises both a RAM component for storing temporary data during the operation of PSU 16 and a ROM component for storing executable programs such as for operating processor 50, data such as identity codes and location information, and text data such as predetermined messages and messages received from IDDU 12 and from other PSU's. Further embodiments may provide the capability to load additional programs and data into the ROM by providing a memory card interface.

A user interacts with PSU 16 via input interface 58 and output interface 60. Input interface 58 preferably consists of a plurality of keys for inputting data such as frequencies, identification codes, encryption key status, outgoing messages and the like and for controlling transceiver 56. Input interface 58 also comprises a microphone (not shown) for use in voice communication. It is appreciated that further embodiments may provide input interfaces with different modalities such as an alphanumeric keyboard, touch screen, dials, knobs, remote microphone, etc., in accordance with then current technology. Output interface 60 comprises a display screen which may be of LCD type or any other type, and which may display parameters such as identification codes, encryption key status, outgoing and incoming messages, and incoming data from IDDU 12 and other PSU's such as identity codes, location information or other data. Output interface 60 also comprises a speaker (not shown) for use in voice communication.

Input and output signals between processor 50 and transciever 56 pass through modulator/demodulator 51. Modulator/demodulator 51 is a standard voice modem that modulates outgoing data on a voice channel to fit any transceiver input signal requirements and demodulates the incoming data on a voice channel from the output signals of a transceiver.

FIG. 3 depicts transceiver 56 as an integral component of PSU 16. PSU 16 may be of conventional design, configured to operate on standard radio communication frequencies using conventional communication parameters such as baud rate, data format, packet size, AM or FM modulation, etc. Further embodiments of SARS 10 will accommodate modifications in radio communication technology as they occur.

Power pack 62 is of a conventional type, designed to deliver appropriate voltages to each of the components of PSU 16 as required. Power pack 62 is powered by a battery (not shown).

PSU 16 is designed to function in four different modes. Its primary function is to serve as a location finding device and as such it serves as a transponder, responding with GPS signals, location information or other text messages to prompts from IDDU 12. Secondly, PSU 16 can remotely interrogate other PSUs to prompt their GPS location information. Thirdly, PSU 16 may exchange text messages with other PSU's. Such messages may be user generated by keying in with input interface 58, or may be predetermined messages stored in memory 52 and selected for transmission. The fourth mode is voice communication exchange with other PSU's.

Figure 4:
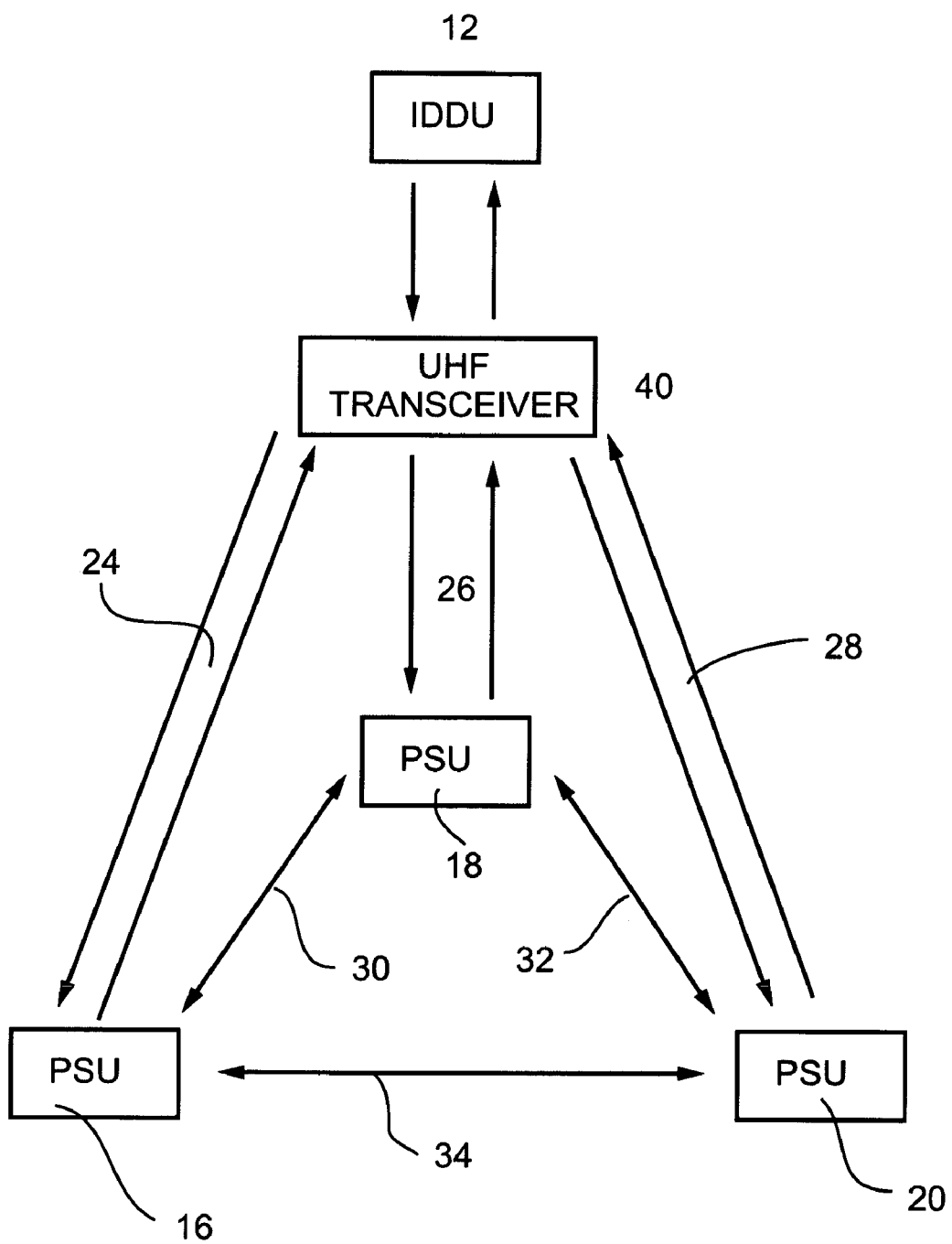
FIG. 4 is a flow chart illustrating a function of the Search And Rescue System of FIG. 1.

Reference is now made to FIG. 4 which is a black box diagram which illustrates the communication function between the components of SARS 10. IDDU 12 has bilateral communication with PSU 16, with PSU 18 and with PSU 20. According to the described preferred embodiment, communication between IDDU 12 and PSU 16, 18 and 20 is limited to prompting and interrogation messages sent by IDDU 12 to one or more of the PSU's and the text response of the recipient. The initiating message by IDDU 12 includes an identification code which is read and matched to a stored identification code by processor 50 of the relevant PSU. A correct match prompts the PSU to respond by transmitting GPS signals or location information derived therefrom to IDDU 12. The response is received by IDDU 12 and stored in its memory 38 and displayed on its output interface 44, thus enabling the search party to learn the location of the relevent PSU.

The Global Positioning System may be used to determine the position of a GPS receiver on or near the surface of the earth from signals received from a constellation of satellites. The orbits of the GPS satellites are arranged in multiple planes in order that signals can be received from at least four satellites at any position on earth. Accordingly, GPS provides a high degree of accuracy both in identifying bearings and, further, in determining a relative distance between two GPS receivers. Either commercial GPS or the military GPS may be used and both provide a degree of accuracy of less than five meters deviation from the actual distance between receivers.

In addition to bilateral communication of text messages between IDDU 12 and PSU 16, 18 and 20, PSU 16, 18, and 20 may communicate text messages between themselves. For example, communication may be initiated by PSU 16 which sends an identification code and an interrogation message to PSU 18. The interrogation message may be automatic such as a request for location information, it may be selected from stored predetermined interrogation messages or it may be generated by the user of PSU 16. The identification code is read and matched to a stored identification code by PSU 18. A correct match prompts PSU 18 to transmit an appropriate response message, which may also be an automatic response such as location information or it may be selected from stored predetermined response messages or it may be generated by the user of PSU 18. Text messages are displayed on the display screen of output interface 60 and stored in memory 52. If the length of the message exceeds the capacity of the display screen, it will be displayed in a scrolling manner.

In addition, PSU 16, 18 and 20 may communicate audio messages between themselves. Such audio messages include the transmission of an identification code which prompts the receiving PSU to enter into an audio reception/response mode. Response messages similarly include an identification code which matches the receiving PSU. This feature, in particular, provides an added element of effectiveness to SARS 10. The searching party, customarily equipped with IDDU 12, will also be equipped with a PSU so that voice communication may be established as the sought party is approached.

It is appreciated that SARS 10 may be used in a wide range of environments, including hostile environments in which the users of PSU 16, 18 and 20 are being sought by hostile forces. In such situations, IDDU 10 and each PSU may be programmed to transmit its own identification code with all outgoing messages so that a recipient may identify the initiator of the message.

It will be appreciated that the scope and nature of the messages capable of being transmitted between IDDU 12 and PSU 16, 18 and 20 will evolve as technology permits and the above description is not intended to be considered as limiting in this regard.

It is easily appreciated that SARS 10 enjoys a wide range of applications as a commercial product rather than as exclusively military or paramilitary equipment. As described hereinbefore, SARS 10 may be designed and configured to be part of or incorporated into an existing mobile radio communication system. Accordingly, SARS 10 may be manufactured and marketed as a relatively inexpensive piece of personal safety equipment.

SARS 10 is particularly useful for the adventurous consumer who flies, sails, hikes or climbs, having features that render it easily man-portable. The SARS 10 system is lightweight and easily hand carried. PSU 16 is easily included among the equipment customarily packed on the above listed adventures and many others. Additional features which enhance its portability include a compact design, rugged construction, and the possibility, in the case of not being integrated with a transceiver, of easy connectability to existing transceivers, compatibility with standard communication systems, and simple operation. It is anticipated that SARS 10 will be an item offered not only in electronics stores but also by adventure outfitters and nautical supply houses.

Moreover, SARS 10 has wide application in the personal security field by providing detection in cases of kidnapping, carjacking and the like, and in theft prevention by detecting the location of cargo or goods exposed to unauthorized conversion in which PSU 16 is secreted.

SARS 10 may be employed from a wide range of rescue platforms. Although IDDU 12 may be easily installed in a search aircraft which has avionics including a transceiver, IDDU 12 with power pack 46 enabled may also be easily brought aboard a balloon, an ultralight or a glider along with a portable transceiver. It may be installed in a search vessel seeking sailors lost at sea or may be brought aboard sport vessels by sunday sailors who intend to venture beyond shore sight. Indeed, SARS 10 is sufficiently light and compact to be backpacked into a wilderness area by a ground based rescue team or by a group of hikers in order to provide for the possibility that members of the group may be separated and lost. It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

It will be appreciated by persons skilled in the art that the present invention is not limited to what has been particularly shown and described hereinabove. Rather, the scope of the present invention is defined by the appended claims and includes both combinations and subcombinations of the various features described hereinabove as well as variations and modifications thereof which would occur to persons skilled in the art upon reading the foregoing description. Accordingly, it is intended to embrace all such alternatives, modifications and variations that fall within the spirit and broad scope of the appended claims.

What is claimed is:

1. A search and rescue system comprising:
   a. an integral Interrogation, Decoding and Display Unit (IDDU) being attachable to a transceiver, said transceiver being capable of operating on standard radio communication frequencies, said IDDU comprising a first processor for generating at least one interrogation message for transmission via said transceiver; and b. at least one Personal Survival Unit (PSU) having a predetermined identification code, said PSU comprising a second transceiver, a GPS module for receiving GPS signals, and a second processor comprising message authorization functionality for identifying received transmissions that comprise said identification code and for authorizing said PSU to respond to said identified transmissions.

2. The search and rescue system of claim 1, wherein said response of said PSU comprises said GPS signals, said GPS signals being usable by said IDDU to derive location information therefrom.

3. The search and rescue system of claim 1, wherein said GPS module comprises a locator unit to derive location informationfrom said GPS signals.

4. The search and rescue system of claim 1, wherein said transceiver is part of a base unit of a mobile radio communication system.

5. The search and rescue system of claim 1, wherein said PSU is incorporated within a mobile unit of said mobile radio communication system.

6. The search and rescue system of claim 1, wherein said IDDU is man portable.

7. The search and rescue system of claim 1, wherein said IDDU further comprises a first memory for storing programs for operating said first processor, identity codes identifying said at least one PSU and responses received from said at least one PSU.

8. The search and rescue system of claim 1, wherein said IDDU further comprises a GPS module for receiving GPS signals and for deriving location information therefrom.

9. The search and rescue system of claim 8, wherein said first memory is further for storing said location information.

10. The search and rescue system of claim 1, wherein said IDDU further comprises a user input interface comprising a numerical keypad.

11. The search and rescue system of claim 1, wherein said IDDU further comprises a user input interface comprising controls for said transceiver.

12. The search and rescue system of claim 1, wherein said IDDU further comprises an output interface comprising a display screen.

13. The search and rescue system of claim 1, wherein said first processor comprises cryptographic functionality for encrypting outgoing messages and decrypting incoming messages.

14. The search and rescue system of claim 1, wherein said first processor is attached to an output for outputting message data for display.

15. The search and rescue system of claim 1, wherein said second processor comprises cryptographic functionality for encrypting outgoing messages and decrypting incoming messages.

16. The search and rescue system of claim 1, wherein said second processor is attached to an output for outputting message data for display.

17. The search and rescue system of claim 1, wherein said PSU further comprises a second memory for storing said at least one identification code and said location information, said second memory further being for storing programs for operating said second processor, text data comprising predetermined messages and messages received, and audio data.

18. The search and rescue system of claim 1, wherein said at least one PSU further comprises a user input interface comprising a plurality of keys.

19. The search and rescue system of claim 1, wherein said at least one PSU further comprises an output interface comprising a display screen.

20. The search and rescue system of claim 1, wherein said at least one PSU is capable of communicating with at least one other PSU that comprises a part of said search and rescue system, said communication including prompting for location information.

21. The search and rescue system of claim 1, wherein said second transceiver is capable of transmitting and receiving text data.

22. The search and rescue system of claim 21, wherein said text data is selected from predetermined messages stored in said second memory.

23. The search and rescue system of claim 1, wherein said at least one PSU further comprises a microphone and a speaker, said second transceiver being for transmitting and receiving audio data.

24. A search and rescue system comprising:

a. An integral Interrogation, Decoding and Display Unit (IDDU) being attachable to a transceiver, said transceiver being capable of operating on standard radio communication frequencies, said IDDU comprising a first processor for generating at least one interrogation message for transmission via said transceiver; and b. a plurality of Personal Survival Units (PSU), each said PSU having a predetermined identification code, each said PSU comprising a second transceiver; a GPS module for receiving GPS signals and a second processor comprising message authorization functionality for identifying received transmissions that comprise said identification code and for authorizing said PSU to respond to said identified transmissions, said second processor being further for selecting at least one additional identification code identifying at least one other said PSU to attach to an outgoing message, said outgoing message thereby being receivable by said other PSU, and for causing said second transceiver to send messages thereto.

25. The search and rescue system of claim 24, wherein said response of said PSU comprises said GPS signals, said GPS signals being usable by said IDDU to derive location information therefrom.

26. The search and rescue system of claim 24, wherein said GPS module comprises a locator unit to derive location information from said GPS signals.

27. The search and rescue system of claim 24, wherein said transceiver is part of a base unit of a mobile radio communication system.

28. The search and rescue system of claim 24, wherein said PSU is incorporated within a mobile unit of said mobile radio communication system.

29. The search and rescue system of claim 24, wherein said IDDU is man portable.

30. The search and rescue system of claim 24, wherein said IDDU further comprises a first memory for storing programs for operating said first processor, identity codes identifying each said PSU and responses received from each said PSU.

31. The search and rescue system of claim 24, wherein said IDDU further comprises a GPS module for receiving GPS signals and for deriving location information therefrom.

32. The search and rescue system of claim 30, wherein said first memory is further for storing said location information.

33. The search and rescue system of claim 24, wherein said IDDU further comprises a user input interface comprising a numerical keypad.

34. The search and rescue system of claim 24, wherein said IDDU further comprises a user input interface comprising controls for said transceiver.

35. The search and rescue system of claim 24, wherein said IDDU further comprises an output interface comprising a display screen.

36. The search and rescue system of claim 24, wherein said first processor comprises cryptographic functionality for encrypting outgoing messages and decrypting incoming messages.

37. The search and rescue system of claim 24, wherein said first processor is attached to an output for outputting message data for display.

38. The search and rescue system of claim 24, wherein said second processor comprises cryptographic functionality for encrypting outgoing messages and decrypting incoming messages.

39. The search and rescue system of claim 24, wherein said second processor is attached to an output for outputting message data.

40. The search and rescue system of claim 24, wherein each said PSU further comprises a second memory for storing said location information, said at least one identification code identifying said PSU and said at least one additional identification code identifying at least one other said PSU, said second memory being for further storing programs for operating said second processor, text data comprising predetermined messages and messages received, and audio data.

41. The search and rescue system of claim 24, wherein each said PSU further comprises a user input interface comprising a plurality of keys.

42. The search and rescue system of claim 24, wherein each said PSU further comprises an output interface comprising a display screen.

43. The search and rescue system of claim 24, wherein each said PSU is capable of communicating with at least one other PSU.

44. The search and rescue system of claim 24, wherein said second transceiver is capable of transmitting and receiving text data.

45. The search and rescue system of claim 44, wherein said text data is selected from predetermined messages stored in said second memory.

46. The search and rescue system of claim 24, wherein each said PSU further comprises a microphone and a speaker, said second transceiver being capable of transmitting and receiving audio data.

* * * * *